US006744225B2

(12) United States Patent
Okamura et al.

(10) Patent No.: US 6,744,225 B2
(45) Date of Patent: Jun. 1, 2004

(54) ION ACCELERATOR

(75) Inventors: Masahiro Okamura, Wako (JP); Takeshi Takeuchi, Wako (JP); Toshiyuki Hattori, Wako (JP)

(73) Assignee: Riken, Wako (JP)

(*) Notice: Subject to any disclaimer, the term of this patent is extended or adjusted under 35 U.S.C. 154(b) by 84 days.

(21) Appl. No.: 10/135,426

(22) Filed: May 1, 2002

(65) Prior Publication Data

US 2002/0180365 A1 Dec. 5, 2002

(30) Foreign Application Priority Data

May 2, 2001 (JP) ....................................... 2001-135357
Aug. 8, 2001 (JP) ....................................... 2001-241023

(51) Int. Cl.[7] ........................... H05H 9/00; H01J 49/00; B01D 59/44

(52) U.S. Cl. .................. 315/505; 315/507; 315/111.21; 315/111.61; 315/111.81; 313/363.1; 250/493.1; 250/423 R; 250/482.21

(58) Field of Search ................................ 315/505, 507, 315/111.21, 111.61, 111.81; 313/363.1; 250/493.1, 423 R, 492.21

(56) References Cited

U.S. PATENT DOCUMENTS 6,020,586 A * 2/2000 Dresch et al. .............. 250/287
6,617,577 B2 * 9/2003 Krutchinsky et al. ....... 250/292

FOREIGN PATENT DOCUMENTS

JP 7-111198 4/1995

OTHER PUBLICATIONS

M. Okamura, et al., "Design Study of RFQ Linac for Laser Ion Source", Proceedings of EPAC, 2000, pp. 848–850.

* cited by examiner

*Primary Examiner*—Nikita Wells
(74) *Attorney, Agent, or Firm*—Oblon, Spivak, McClelland, Maier & Neustadt, P.C.

(57) ABSTRACT

The present invention mainly relates to an ion accelerator with significantly simplified construction, for accelerating an much larger amount of ions, wherein that a plasma-generating target 12, a vacuum chamber 16 for extracting ions from plasma generated from the plasma-generating target 12, and an ion linac 30 are connected in series, the vacuum chamber 16 is installed near an ion entrance of the ion linac 30, the ion accelerator also has a high voltage power supply boosting the vacuum chamber 16 to a desired voltage, and ions are directly injected from the vacuum chamber 16 to the ion linac 30.

In addition, so as to improve the above-described ion accelerator 20, to greatly simplifying construction, to efficiently extracting all the ions included in accelerable plasma that is generated, and to be able to accelerate an ion beam with large pulse width, an ion accelerator has the construction that a plasma-generating target 112 for generating plasma by radiating a plasma generating laser L, a vacuum chamber 116 that extracts ions from plasma generated in the plasma-generating target 112 and is directly installed in an ion entrance 138 of an ionic linac 130, and an ion linac 130 are serially connected so that ions may be directly injected into the ion linac 130 by using the diffusion velocity of the plasma.

18 Claims, 13 Drawing Sheets

ION ACCELERATOR

BACKGROUND OF THE INVENTION

1. Field of the Invention

The present invention relates to an ion accelerator for efficiently injecting ions generated in plasma to an ion linac, and a high-intensity direct ion injection method using this ion accelerator and an ion accelerator which is improved and injects still more efficiently ions, generated in a plasma-generating target by radiating a plasma-generating laser, into an ion linac by using the diffusion velocity of this plasma.

2. Description of the Related Art

Ion accelerators which inject ions generated in plasma to an ion linac such as an RFQ linac or a drift tube linac and accelerate the ions have been developed.

It is possible to use such an ion accelerator as a first-stage ion accelerator in an accelerator for cancer treatment, in an ion implantation accelerator for semiconductor production, and in a large-scale accelerator complex for physical experiments.

This ion accelerator will be described with reference to FIG. 11.

FIG. 11 is a plan for schematically showing the construction of a conventional ion accelerator 200.

As shown in FIG. 11, the conventional ion accelerator 200 mainly consists of an ion source 210, a beam line 220, and an ion linac 230.

Hereinafter, each major component of the conventional ion accelerator 200 will be described below.

As the ion linac 230, a well-known ion linac such as an RFQ linac described later, or a drift tube linac is used.

In FIG. 11, reference numeral 60 denotes a laser generator for generating a plasma-generating laser L, and reference numerals 62A and 62B denote mirrors guiding the plasma-generating laser L to an ion source 210.

In addition, reference numeral 70 denotes an analysis electromagnet for providing ions accelerated by the ion accelerator 200, for other applications such as the accelerator for cancer treatment, ion implantation accelerator for semiconductor production, or large-scale accelerator complex for physical experiments, which are described above.

Generally, an ion source is an apparatus wherein plasma with ions and electrons coexisting with each other is generated in a vacuum chamber by high-frequency power, laser heating, etc., and a high voltage is applied to the vacuum chamber to take out only ions from its inside, producing an ion beam.

The ion source 210 that is used for the conventional ion accelerator 200 shown in FIG. 11 comprises a plasma-generating target 212 which is subject to radiation of a plasma-generating laser L to generate the plasma, a focusing lens 214 which condenses the plasma-generating laser L at the plasma-generating target 212, a vacuum chamber 216 which contains the generated plasma, and an ion extraction electrode 218.

As shown in FIG. 11, the plasma-generating laser L generated by the laser generator 60 is radiated at the plasma-generating target 212 through the two mirrors 62A and 62B, and focusing lens 214 in the vacuum chamber 216 of the ion source 210 to generate the plasma by laser ablation.

Since the plasma generated in the vacuum chamber 216 is in the status in which ions and electrons coexist as described above, an ion beam is led to an adjoining beam line 220 by applying a negative voltage of several kV to several tens kV to the ion extraction electrode 218.

The beam line 220 comprises one or more ion beam focusing lenses 222 (two in FIG. 11), such as a solenoid type magnet or an Einzel electrostatic lens.

In addition, in order to control the status of an ion beam, a beam shape diagnostic tool 224 is often provided between the focusing lenses 222.

In the above construction, the basic operation of the conventional ion accelerator 200 will be described by using FIG. 11.

In the conventional ion accelerator 200, the plasma generation laser L is radiated at the plasma-generating target 212 to generate the plasma, ions extracted by the extraction electrode 218 from this generated plasma are injected into the ion linac 230 through the beam line 220.

At this time, it is possible to obtain the maximum values of the magnitude and gradient of an ion beam that suit the beam line 220 after the ion source 210 by adjusting the geometry and the applied potential gradient of the extraction electrode 218 which is an electrode for applying a high voltage.

In addition, the ion beam radius is expanded to large radius after the extraction by using a solenoid type magnet or the focusing lens 222 such as an Einzel electrostatic lens, travels with relatively low influence of Coulomb repulsion, is converged by means of the focusing lens 222 to the beam size of suitable injecting conditions for the ion linac 230, and is injected.

Next, as an example of the ion linac 230, as disclosed in Japanese Patent Laid-Open No. 7-111198, the well-known RFQ linac 230 will be supplementarily described by using FIGS. 12 and 13.

FIG. 12 is a cross sectional front view showing the construction of the RFQ linac 230.

FIG. 13 is a longitudinal sectional side view showing the construction of the RFQ linac 230.

The RFQ (Radio Frequency Quadrupole) linac 230 is mainly constituted by installing four vane electrodes 234 (or four rod electrodes), made to be perpendicular to each other, inside a conductive cylindrical container 232 whose inside is in vacuum.

A resonator comprises a cylindrical container 232 and vane electrodes 234, as shown in FIG. 13, high-frequency power is supplied through the high-frequency waveguide 238, and the vane electrodes 234 with end portions 234*a* in a wave form converge the ions and accelerates the ions in a direction of the central axis with a desired energy.

However, in the conventional ion accelerator with the above-described combination of the ion source, the beam line for transporting a low-energy ion beam, and the ion linac, the divergence of the beam by the Coulomb repulsion in the ion beam is large especially when a large-current ion source is used, and thus, only a part of the extracted ion beam can meet injection conditions of the ion linac, resulting a problem that only a small amount of ions to be accelerated.

In addition, since the amount of an ion beam current and the number of charges of generated ions, etc. largely change within a beam generating pulse of a duration of several $\mu$s when a pulsed ion source with laser heating etc. is used as an ion source, it is very difficult to appropriately design a beam line while considering the Coulomb repulsion.

Furthermore, the conventional ion accelerator has a problem that it requires a complicated beam line including apparatuses such as a focusing lens.

An object of the present invention is to provide an ion accelerator where an amount of accelerable ions significantly increases by solving the above-described conventional problems, dramatically simplifying the combination of an ion source, a beam line, and an ion linac, and furthermore, further reducing the influence of Coulomb repulsion, and a direct ion injection method for efficiently injecting ions by using this ion accelerator and an ion accelerator which is improved and injects still more efficiently ions, generated in a plasma-generating target by radiating a plasma-generating laser, into an ion linac by using the diffusion velocity of this plasma.

SUMMARY OF THE INVENTION

In order to solve the problems, a first aspect the present invention is an ion accelerator comprising: a plasma-generating source; a vacuum chamber for extracting ions from plasma generated from the plasma-generating source; an ion linac, the plasma-generating source, vacuum chamber, and ion linac being connected in series, the vacuum chamber being installed near an ion entrance of the ion linac; and a high voltage power supply for boosting the vacuum chamber to a desired voltage, wherein ions are directly injected from the vacuum chamber to the ion linac.

Owing to such construction, since Coulomb repulsion is not generated because electrons with negative charges and ions with positive charges coexist in plasma, its influence is avoidable to the point just before an ion linac, and in consequence, the construction is simplified and an amount of accelerable ions also significantly increases.

According to a second aspect of the present invention is an ion accelerator wherein an injection slit is installed in an ion entrance of the ion linac.

Owing to such construction, it is possible when the divergence angle of the generated plasma is large to prevent bombardment with excess plasma onto an acceleration electrode of the linac, and discharge occurrence.

In addition, usually, since a strong high-frequency electric field is generated near an entrance of an ion linac, and hence few electrons passing the slit in this region can be injected to an acceleration channel of the linac, the ions and electrons are efficiently separated.

A third aspect of the present invention is an ion accelerator wherein the injection slit is adjustably installed in a radial direction of the ion entrance of the ion linac.

Owing to such construction, it becomes possible to perform positioning for the accurate centering of the injection slit with respect to the linac.

A fourth aspect of the present invention is an ion accelerator wherein the plasma-generating source is a plasma-generating target for generating plasma by a plasma-generating laser being radiated thereon.

Owing to such construction, since high-density plasma can be generated, it becomes possible to increase the intensity of accelerable ions.

A fifth aspect of the present invention is an ion accelerator wherein a focusing for the plasma-generating laser radiated to the plasma-generating target is installed in the vacuum chamber.

Owing to such construction, since the density of the plasma-generating laser on the plasma-generating target increases, it becomes possible to increase plasma generation efficiency.

A sixth aspect of the present invention is an ion accelerator wherein the focusing is installed so that it can move in three axes.

Owing to such construction, it becomes possible to adjust a focusing position of the plasma-generating laser on the plasma-generating target.

A seventh aspect of the present invention is an ion accelerator comprising a target positioning device having one or more mirrors and one or more centering lasers, which performs the alignment of the plasma-generating target with a focus of the plasma-generating laser.

Owing to such construction, it becomes possible to perform the accurate alignment of the plasma-generating target with the focus of the plasma-generating laser.

An eighth aspect of the present invention is an ion accelerator comprising a set of split type focusing lenses that are installed inside the ion linac and can concentrate the laser beam onto the target.

Owing to such construction, since the distance between the plasma-generating target and ion linac is reduced, it becomes possible to increase an amount of accelerable ions.

A ninth aspect of the present invention is an ion accelerator wherein the plasma-generating target is cylindrical so as to be rotatable.

Owing to such construction, although the plasma-generating target is damaged when the plasma-generating laser is radiated, it becomes possible to always obtain a good target surface without exchanging the plasma-generating target by rotating the plasma-generating target by a predetermined angle to change a radiated position.

A tenth aspect of the present invention is an ion accelerator wherein the vacuum chamber is boosted by the high-voltage power supply so that the injection energy of ions is a design injection energy of the ion linac.

Owing to such construction, since the voltage equivalent to the ion beam energy for satisfying the design condition of the ion linac is applied to the vacuum chamber with the generated plasma, only the ions having passed the slit are injected into the ion linac and accelerated.

At that time, since the ion beam is in a state just after being emitted from the plasma, the influence of Coulomb repulsion is very small, and hence, it is also possible to avoid the influence of the abrupt change of the number of ionic charges and the amount of current which changes within a pulse.

An eleventh aspect of the present invention is a direct ion injection method for using the ion accelerator according to any of claims 1 to 10, so as to directly inject ions generated from the plasma-generating source, from an ion entrance of an ion linac.

Then, since Coulomb repulsion is not generated because electrons with negative charges and ions with positive charges coexist in plasma, its influence is avoidable to the point just before an ion linac, and in consequence, the construction is simplified and an amount of accelerable ions also significantly increases.

A twelfth aspect of the present invention is an ion accelerator constituted by serially connecting a plasma-generating target for generating plasma by radiating a plasma generating laser, a vacuum chamber that extracts ions from plasma generated in the above-described plasma-generating target and is directly installed in an ion entrance of an ionic linac, and an ion linac, so that ions may be directly injected into the above-described ion linac by using the diffusion velocity of the plasma.

Owing to such constitution, it becomes possible to let the plasma-generating target get close to an acceleration electrode of the ion linac to a limit since it becomes unnecessary to install a vacuum chamber, to which a high voltage is applied and in which plasma is generated, through an insulated section with differing from the ion accelerators mentioned in the above-described first to eleventh aspects, and hence, it becomes possible to inject almost all of generated ions into the ion linac at the diffusion velocity of the plasma itself without applying a high voltage.

Therefore, it is possible to efficiently accelerate even a pulsed ion beam with large current, which is excited by a laser, by a simplified apparatus.

In this result, since Coulomb repulsion is not generated because electrons with negative charges and ions with positive charges are intermingled in plasma, its influence is avoidable just before the ion linac.

At that time, since the ion beam is immediately after being emitted from the plasma, the influence of the Coulomb repulsion is very small, and hence, it is also possible to avoid the influence of the abrupt change of the number of ionic charges and the amount of current that changes within a pulse.

In addition, usually, since a strong high-frequency electric field is generated inside an ion linac, and hence almost no injected electrons can stay in an acceleration channel of the linac, the ions and electrons are efficiently separated.

A thirteenth aspect of the present invention is an ion accelerator that is constituted so that a non-modulation section for extending the pulse width of ions may be formed in the acceleration electrode of the ion linac used for the above-described ion accelerator.

Owing to such construction, since an ion beam, which is separated and captured by the ion linac, is at comparatively low speed and has the velocity distribution of each ion particle that is the same extent of speed as that of the ion beam, it is possible to generate several tens $\mu$s of pulse width with a several-meter long ion accelerator since ions spread in the axial direction of the ion accelerator by performing such design that an area where an accelerating electric field in the ion accelerator is not generated may become long.

According to a fourteenth aspect of the present invention, an ion accelerator has the construction that an injection slit is installed in the ion entrance of the above-described ion linac.

Owing to such construction, it is possible to prevent a discharge from being caused by excessive plasma striking an acceleration electrode of the linac when a divergence angle of the generated plasma is large.

In addition, usually, since a strong high-frequency electric field is generated near an entrance of an ion linac, and hence almost no electrons passing the slit in this region can be injected to an acceleration channel of the linac, the ions and electrons are efficiently separated.

A fifteenth aspect of the present invention is an ion accelerator having the construction that the above-described injection slit is adjustably installed in the radial direction of the ion entrance of the above-described ion linac.

Owing to such construction, it becomes possible to perform positioning for the accurate centering of the injection slit to the linac.

A sixteenth aspect of the present invention is an ion accelerator comprising a split type focusing lens that is installed inside the above-described ion linac and condenses a plasma-generating laser.

Owing to such construction, since the distance between the plasma-generating target and ion linac becomes short, it becomes possible to increase an amount of accelerable ions.

According to a seventeenth aspect of the present invention, an ion accelerator has the construction that the above-described beam-condensing unit is installed so that it can move in three axes.

Owing to such construction, it becomes possible to adjust a focusing position of the plasma-generating laser on the plasma-generating target.

An eighteenth aspect of the present invention is an ion accelerator comprising one or more mirrors, one or more centering lasers, and a target positioning device that performs the alignment of the plasma-generating target and a focus of the plasma-generating laser.

Owing to such construction, it becomes possible to perform the accurate alignment of the plasma-generating target and the focus of the plasma-generating laser.

A nineteenth aspect of the present invention is an ion accelerator where the above-described plasma-generating target is cylindrical so as to be rotatable.

Owing to such construction, although the plasma-generating target is damaged when a plasma-generating laser is radiated, it becomes possible to always obtain a good target surface without exchanging the plasma-generating target by changing a radiated position by rotating the plasma-generating target by a predetermined angle.

A twentieth aspect of the present invention is an ion accelerator constituted by using an RFQ linac or a drift tube type linac as the above-described ion linac.

Owing to such construction, it becomes possible to obtain an ion accelerator equipped with an ion linac suitable for ion acceleration.

DETAILED DESCRIPTION OF THE PREFERRED EMBODIMENTS

EXAMPLES

Figure 9:
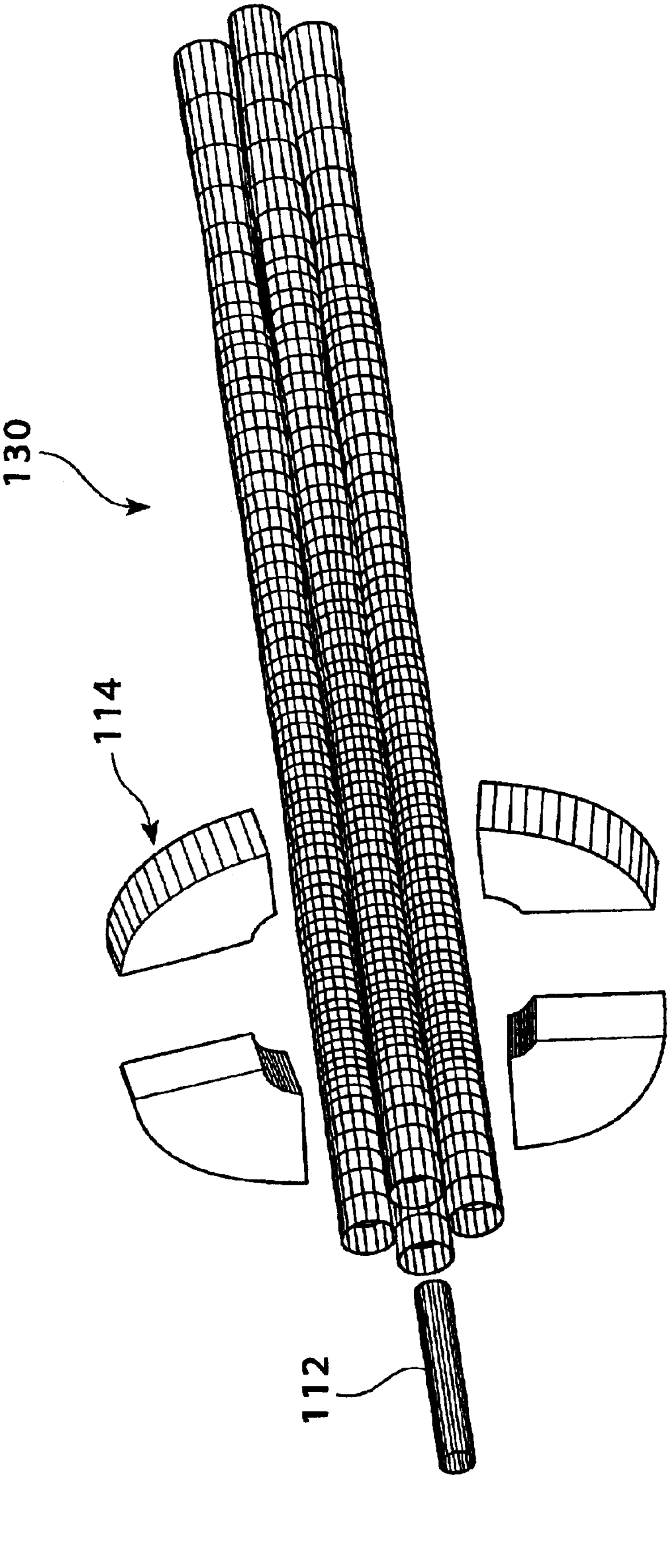
FIG. 9 is a schematic constitutional perspective view of a case where a plasma-generating target and a focusing lens are arranged at the time of using a four-rod type RFQ linac as an ion linac used for the ion accelerator according to the second example of the present invention.
Figure 10:
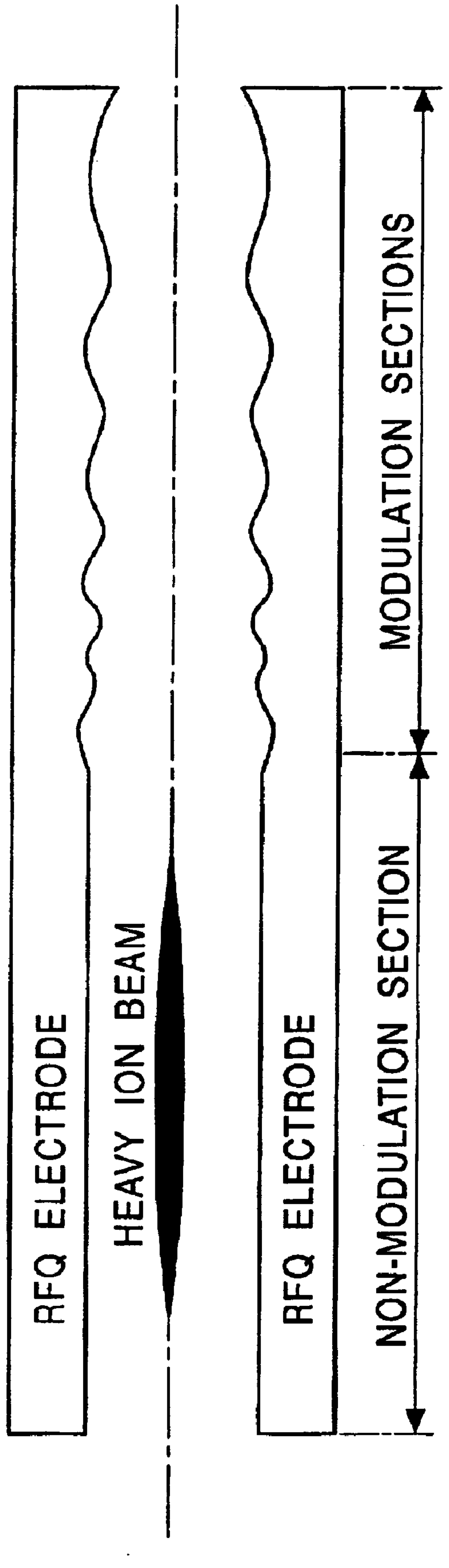
FIG. 10 is a horizontal or vertical sectional view of an RFQ electrode in the case where a four-vane type RFQ linac is used as an ion linac used for the ion accelerator according to the second example of the present invention and a non-modulation section is formed in this vane electrode.
Figure 11:
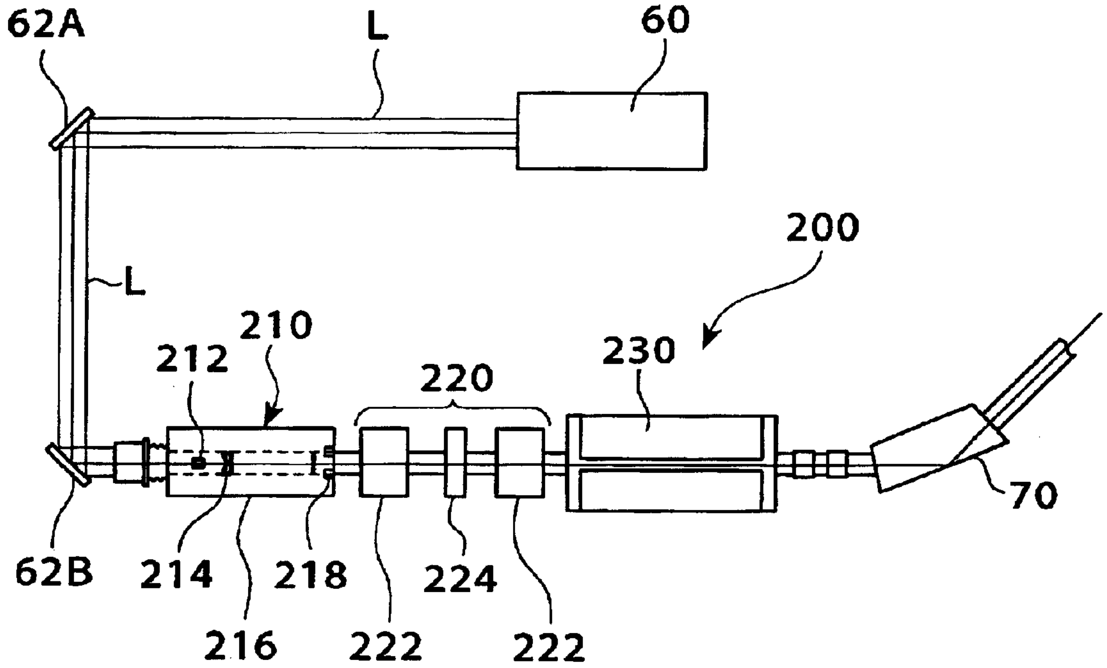
FIG. 11 PRIOR ART
FIG. 11 is a plan showing the overview of a conventional accelerator.

Hereafter, an ion accelerator according to the first example of the present invention, a direct ion injection method using this apparatus, and ion accelerator according to the second example that is obtained by improving the ion accelerator according to the above-described first example will be successively described by using FIGS. 1 to 10 with reference to FIG. 11.

First Example

First, with taking for an example the case where a plasma-generating target is used as a plasma-generating source, first example of the ion accelerator according to the present invention will be described by using FIGS. 1 and 2.

Figure 1:
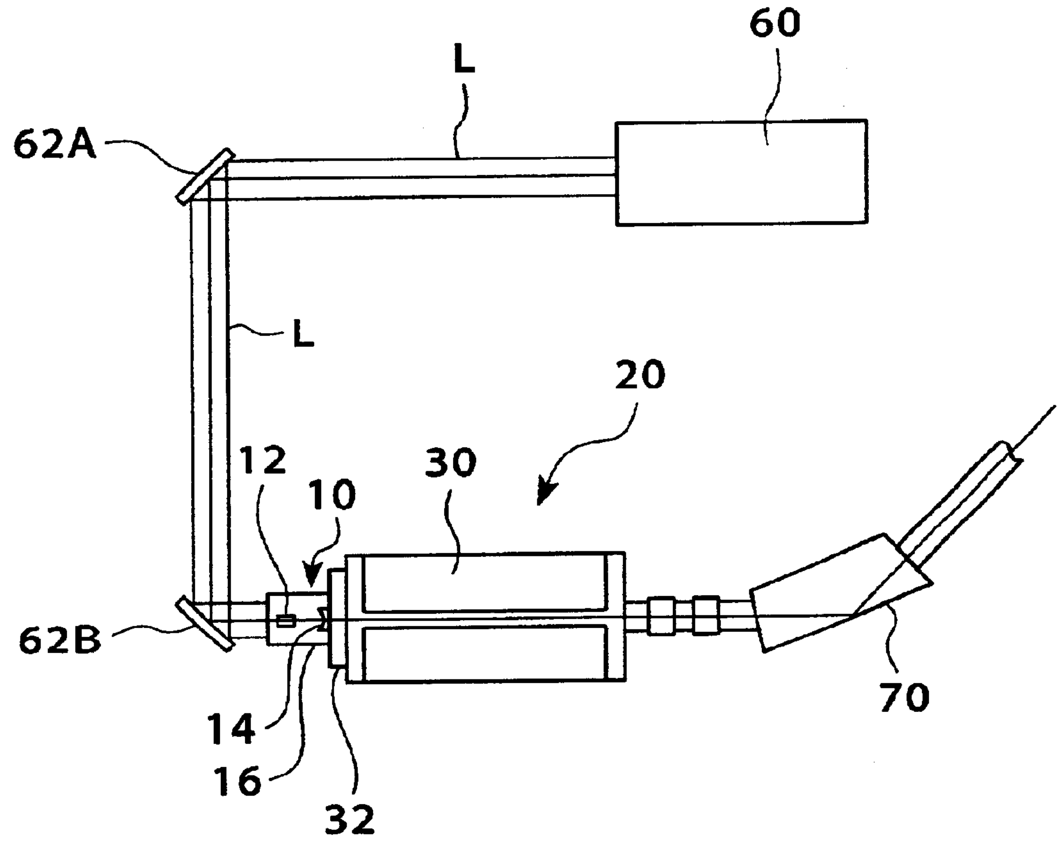
FIG. 1 is a plan showing the overview of an accelerator according to a first example of the present invention.

FIG. 1 is a plan showing the overview of an accelerator 20 according to this example.

Figure 2:
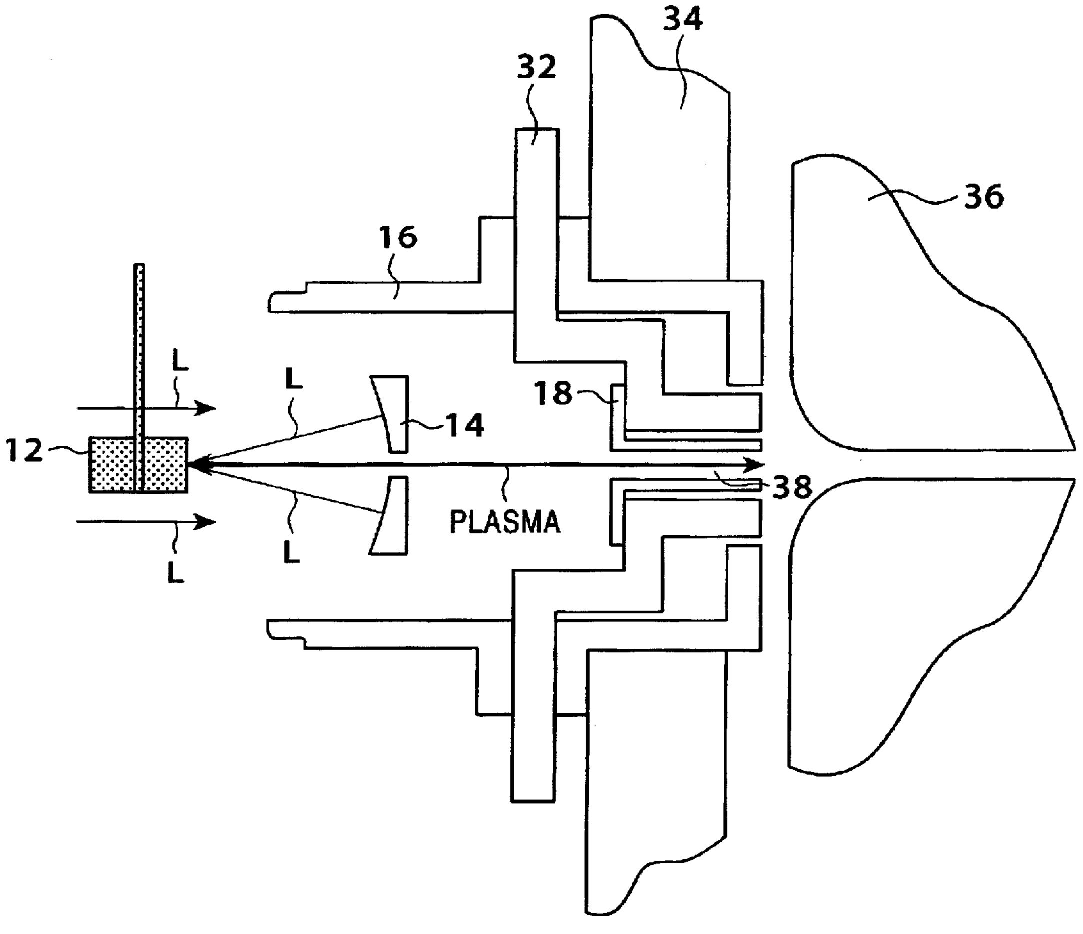
FIG. 2 is a partially enlarged sectional view of a plasma-generating portion of a direct ion injection system that is used for an ion accelerator according to the first example of the present invention, and the vicinity of an ion entrance of the ion accelerator.

FIG. 2 is a partially enlarged sectional view of a plasma-generating part of a direct ion injection system 10 that is used for the ion accelerator 20 according to the example, and the vicinity of an ion entrance of the ion accelerator 20.

First, the construction of the accelerator 20 according to this example will be described.

The ion accelerator 20 according to this example comprises an ion linac 30, and a direct ion injection system 10 installed near an ion entrance 38 (refer to FIG. 2) of this ion linac 30 used for the ion accelerator 20.

Figure 12:
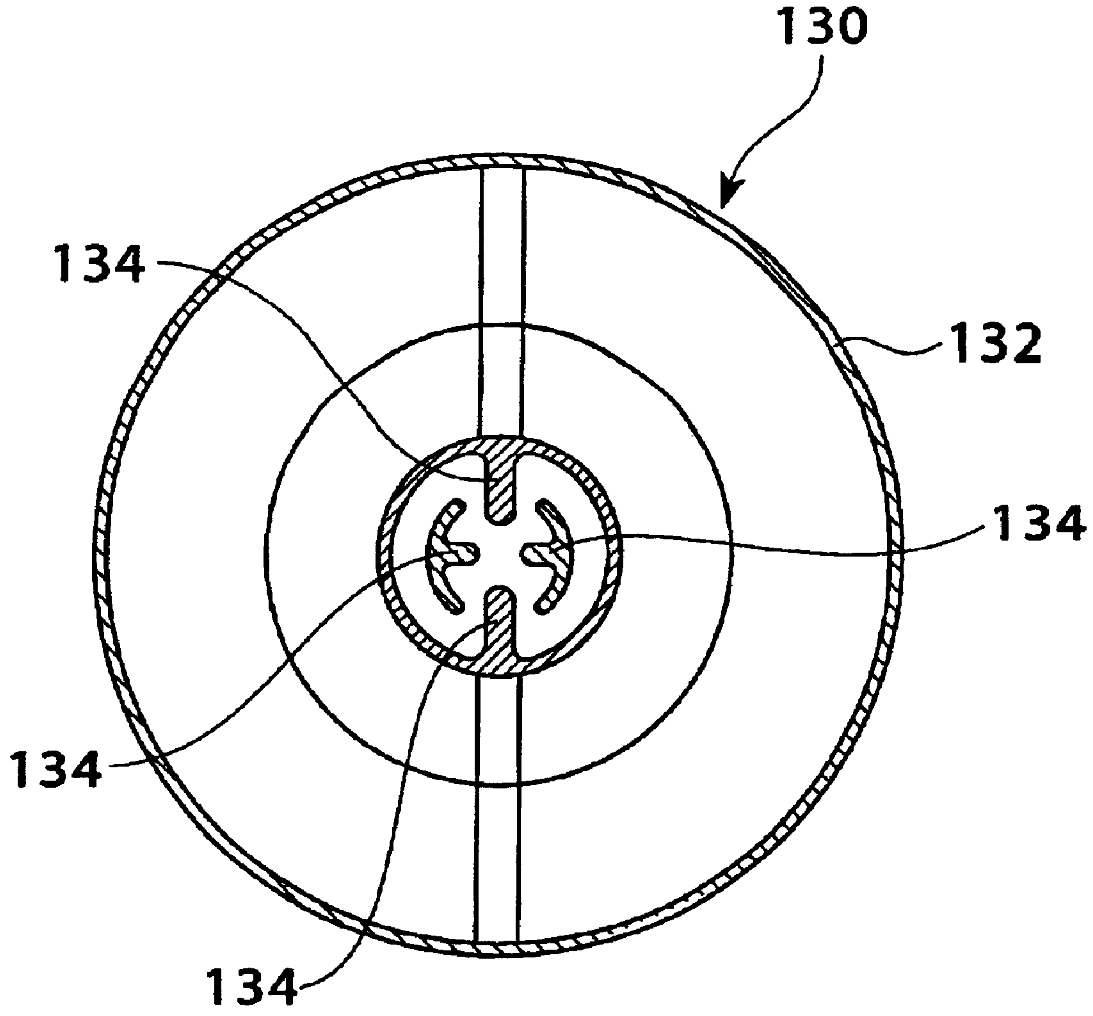
FIG. 12 PRIOR ART
FIG. 12 is a cross sectional front view showing the construction of an RFQ linac.
Figure 13:
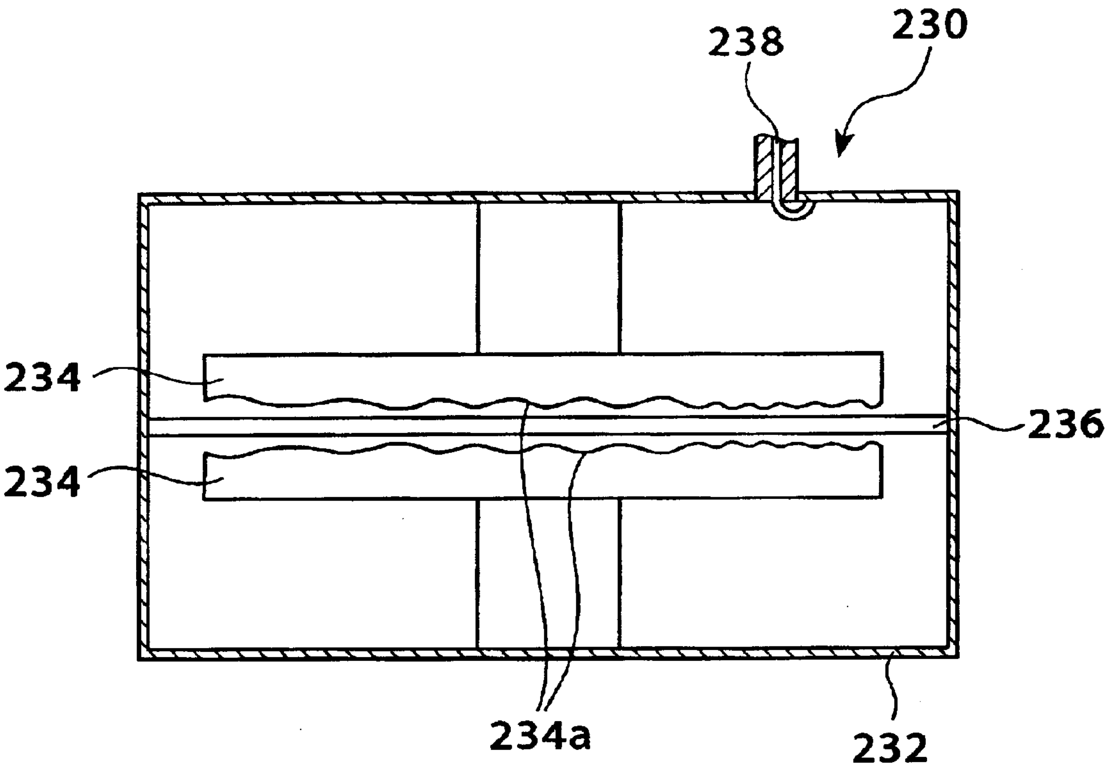
FIG. 13 PRIOR ART
FIG. 13 is a longitudinal sectional side view showing the construction of the RFQ linac.

In the ion accelerator 20 according to this example, as an ion linac 30, for example, a conventional ion linac 230 shown in FIGS. 12 and 13 is used almost as it is.

On the other hand, as shown in FIG. 1, the direct ion injection system 10 comprises a plasma-generating target 12 which radiates a plasma-generating laser L to generate the plasma, a focusing lens 14 which condenses the plasma-generating laser L at the plasma-generating target 12, a vacuum chamber 16 which contains the generated plasma, and an injection slit 18 (refer to FIG. 2).

In addition, the direct ion injection system 10 used for the ion accelerator 20 according to this example differs from a conventional ion source 210 (refer to FIG. 11), boosts the vacuum chamber 16 by using a high voltage power supply (not shown) without using an ion extraction electrode 218, and extracts ions from the plasma.

Furthermore, the vacuum chamber 16 is installed through an insulation flange 32 in a resonator 34 of the ion linac 30 near the ion entrance 38 of the ion linac 30.

In addition, the injection slit 18 is installed in the ion entrance 38 of the ion linac 30.

Furthermore, in FIG. 1, a laser generator 60 and mirrors 62A and 62B are the same as those shown in FIG. 11.

In the above construction, the basic operation of the ion accelerator 20 and direct ion injection method according to this example will be described by using FIGS. 1 and 2.

Similarly to the laser described in the conventional ion accelerator 200 (refer to FIG. 11), the pulse-form plasma-generating laser L generated by the laser generator 60 is led to the vacuum chamber 16 by the mirrors 62A and 62B, is reflected by the focusing lens 14, and is condensed at the plasma-generating target 12, and hence, plasma is generated from a surface of the heated plasma-generating target 12.

The generated plasma fills a space between the injection slit 18 and plasma-generating target 12, ions and electrons passing the injection slit 18 advance into the resonator 34 of the ion linac 30 through the ion entrance 38, and because the difference in mass between the ion and electron, the ions having the design injection potential of the ion linac 30 are incident to an acceleration channel (a gap of the electrode 36) and the electrons receives divergence force and are finally absorbed by the inner wall of the resonator 34.

The ion beam injected into the acceleration channel is captured by the convergence force of the ion linac 30 before diverging under the influence of Coulomb repulsion, and is accelerated to design beam energy.

In such a manner, since the voltage equivalent to the ion beam energy for satisfying the design condition of the ion linac 30 is applied to the vacuum chamber 16 with the generated plasma, only the ions which have passed the injection slit 18 are injected into the ion linac 30 and accelerated.

Therefore, since electrons with negative charges and ions with positive charges coexist in the plasma because the ion accelerator 20 according to this example directly injects ions to the ion linac 30, Coulomb repulsion is not generated, and hence, it is possible to avoid its influence to the point just before the ion linac.

Consequently, since the construction of the ion accelerator 20 using this direct ion injection system 10 is simplified, the amount of ions accelerable by the ion acceleration method according to the present invention also significantly increases by using this ion accelerator 20.

In addition, since the vacuum chamber 16 is installed through the insulated flange 32 in the resonator 34 of the ion linac 30, it is possible to isolate the vacuum chamber 16 from the resonator 34, and hence, the direct ion injection is stabilized.

Furthermore, since the injection slit 18 is installed in the ion entrance 38 of the ion linac 30, excessive plasma strikes the acceleration electrode 36 of the linac 30 if a divergence angle of the generated plasma is large, and hence it is possible to prevent the situation of causing a discharge.

In addition, usually, since a strong high-frequency electric field is generated near an entrance of the ion linac 30, and hence few electrons passing the injection slit 18 in this region can be injected to an acceleration channel of the linac 30, the ions and electrons are efficiently separated.

Next, the direct ion injection systems 10A to 10D of respective examples that are different from the direct ion injection system 10 used for the ion accelerator 20 of the above-described example will be simply described one by one by using FIGS. 3 to 7.

Figure 3:
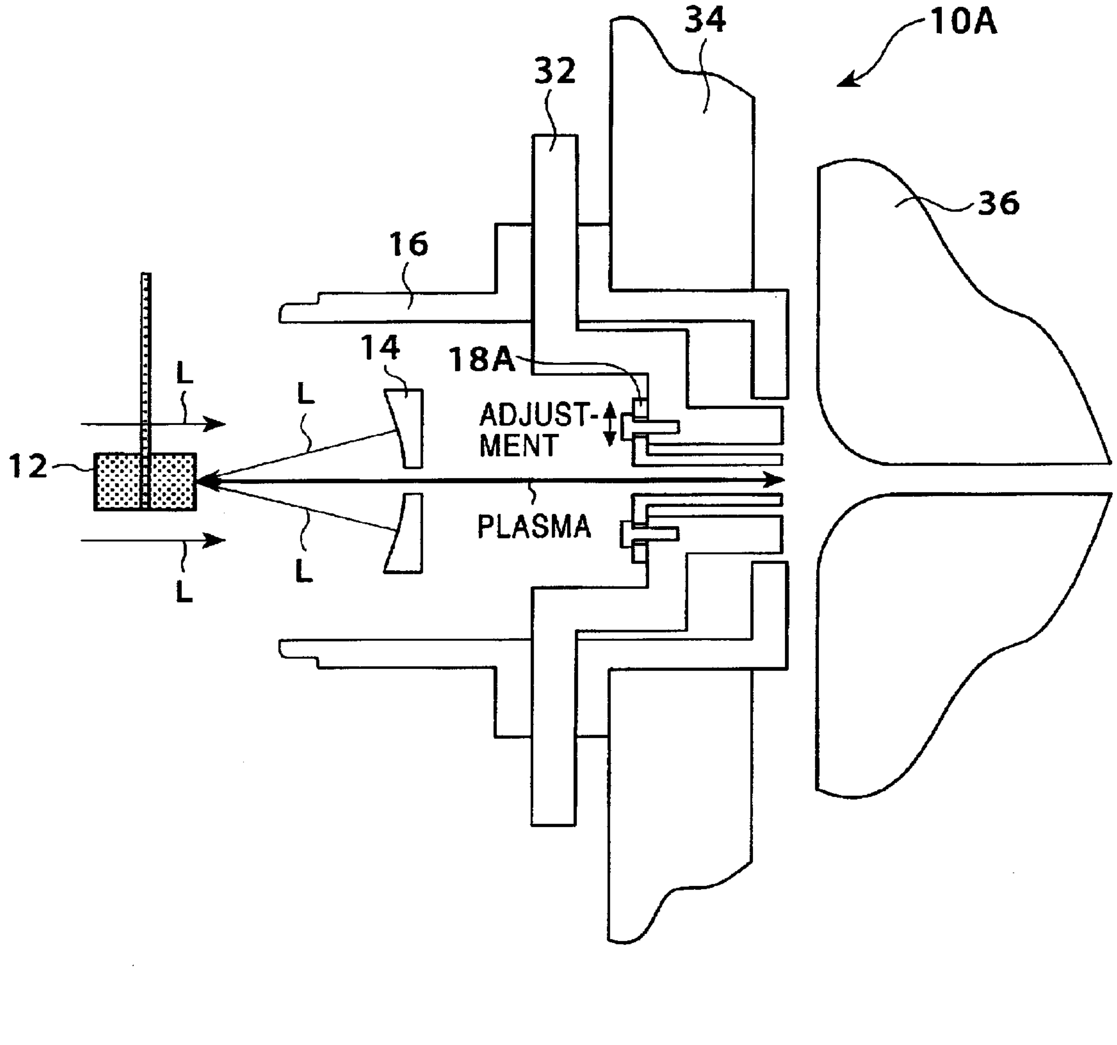
FIG. 3 is a partially enlarged sectional view of a plasma-generating portion in another example of a direct ion injection system that is used for an ion accelerator according to the first example of the present invention, and the vicinity of an ion entrance of the ion accelerator.

First, in the direct ion injection system 10A of the ion accelerator 20 according to the example shown in FIG. 3, respective construction of the plasma-generating target 12, a lens 14, and the vacuum chamber 16 are common to those of the direct ion injection system 10 shown in FIG. 2.

On the other hand, in this example, as shown in FIG. 3, an injection slit 18A is installed in the insulated flange 32 of the ion linac 30 so that its position can be adjusted with play provided in tapped holes.

Owing to such construction, it becomes possible to perform the positioning for the accurate centering of the injection slit 18A with respect to the ion linac 30.

Figure 4:
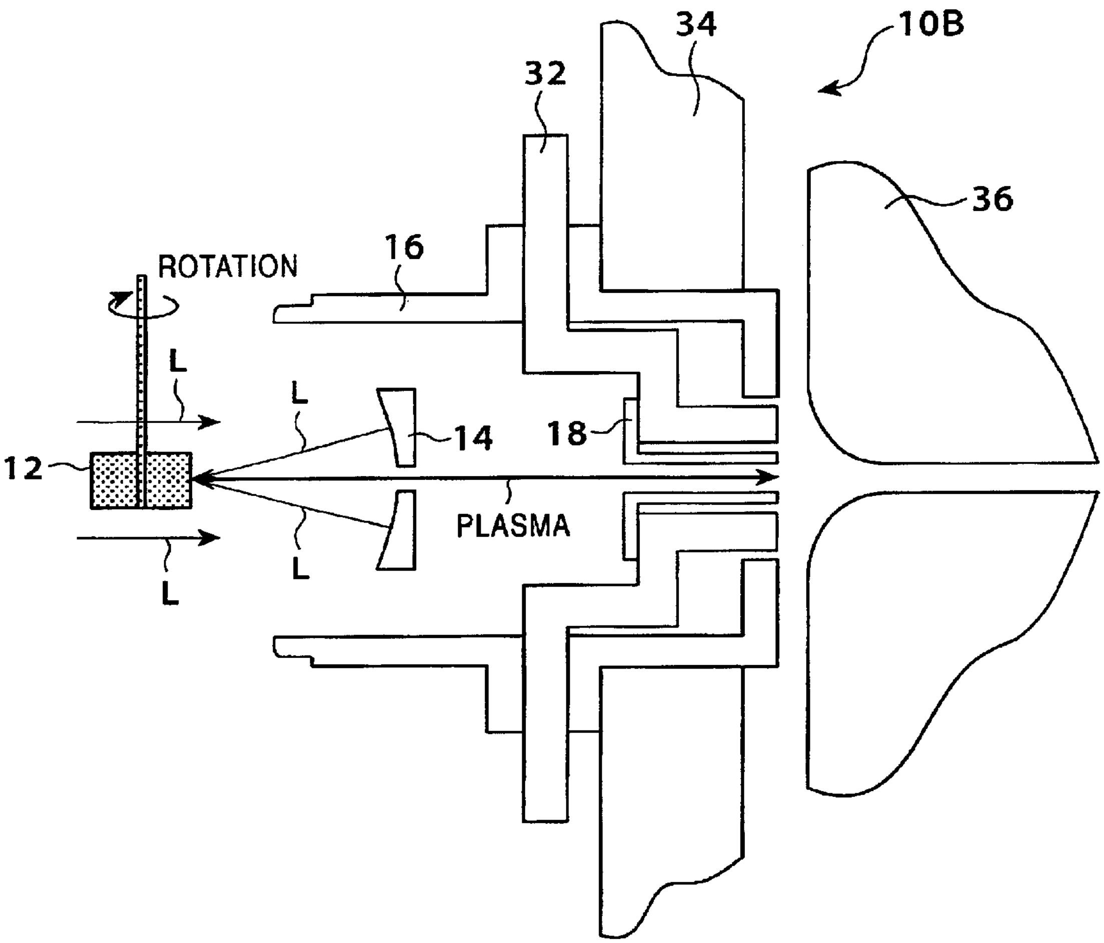
FIG. 4 is a partially expanded sectional view of a plasma-generating portion in still another example of a direct ion injection system that is used for an ion accelerator according to the first example of the present invention, and the vicinity of an ion entrance of the ion accelerator.

Next, in the direct ion injection system 10B of the ion accelerator 20 according to the example shown in FIG. 4, respective constructions of the focusing lens 14, vacuum chamber 16, and injection slit 18 are common to those of the direct ion injection system 10 shown in FIG. 2.

On the other hand, in this example, as shown in FIG. 4, a plasma-generating target 12A is cylindrical so as to be rotatable.

Owing to such construction, although the plasma-generating target 12A is damaged when the plasma-generating laser L is radiated, it becomes possible to always obtain a good target surface without exchanging the plasma-generating target 12A by rotating the plasma-generating target 12A by a predetermined angle to change a radiated position.

Figure 5:
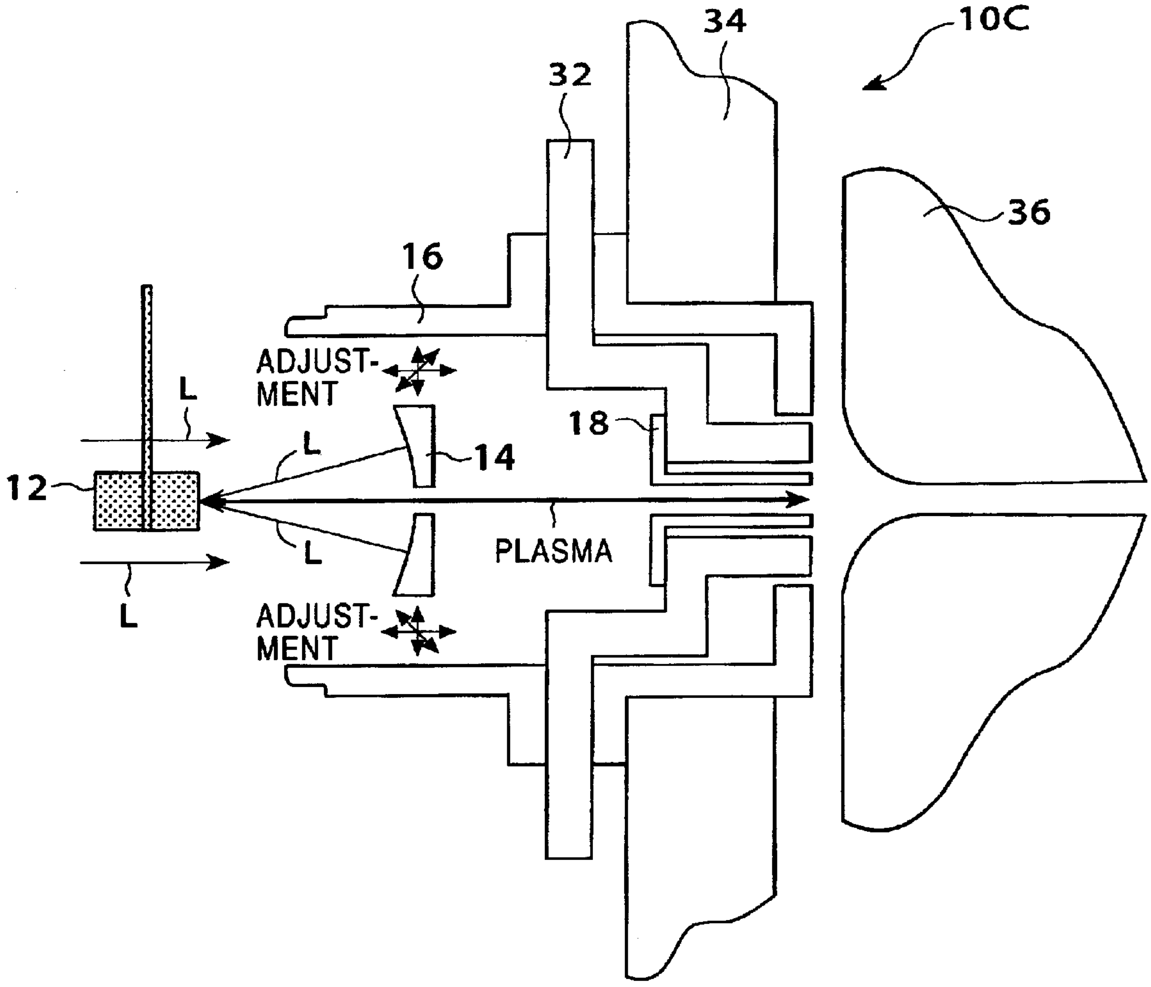
FIG. 5 is a partially expanded sectional view of a plasma-generating portion in a further example of a direct ion injection system that is used for an ion accelerator according to the first example of the present invention, and the vicinity of an ion entrance of the ion accelerator.

Next, in the direct ion injection system 10C of the ion accelerator 20 according to the example shown in FIG. 5, respective constructions of the plasma-generating target 12, vacuum chamber 16, and injection slit 18 are common to those of the direct ion injection system 10 shown in FIG. 2.

On the other hand, this example is constituted so that the focusing 14A can move in three axes by installing the focusing 14A with a bellows etc., as shown in FIG. 5.

Owing to such construction, it becomes possible to adjust a focusing position of the plasma-generating laser L on the plasma-generating target 12, and to enhance plasma-generating efficiency.

Figure 6:
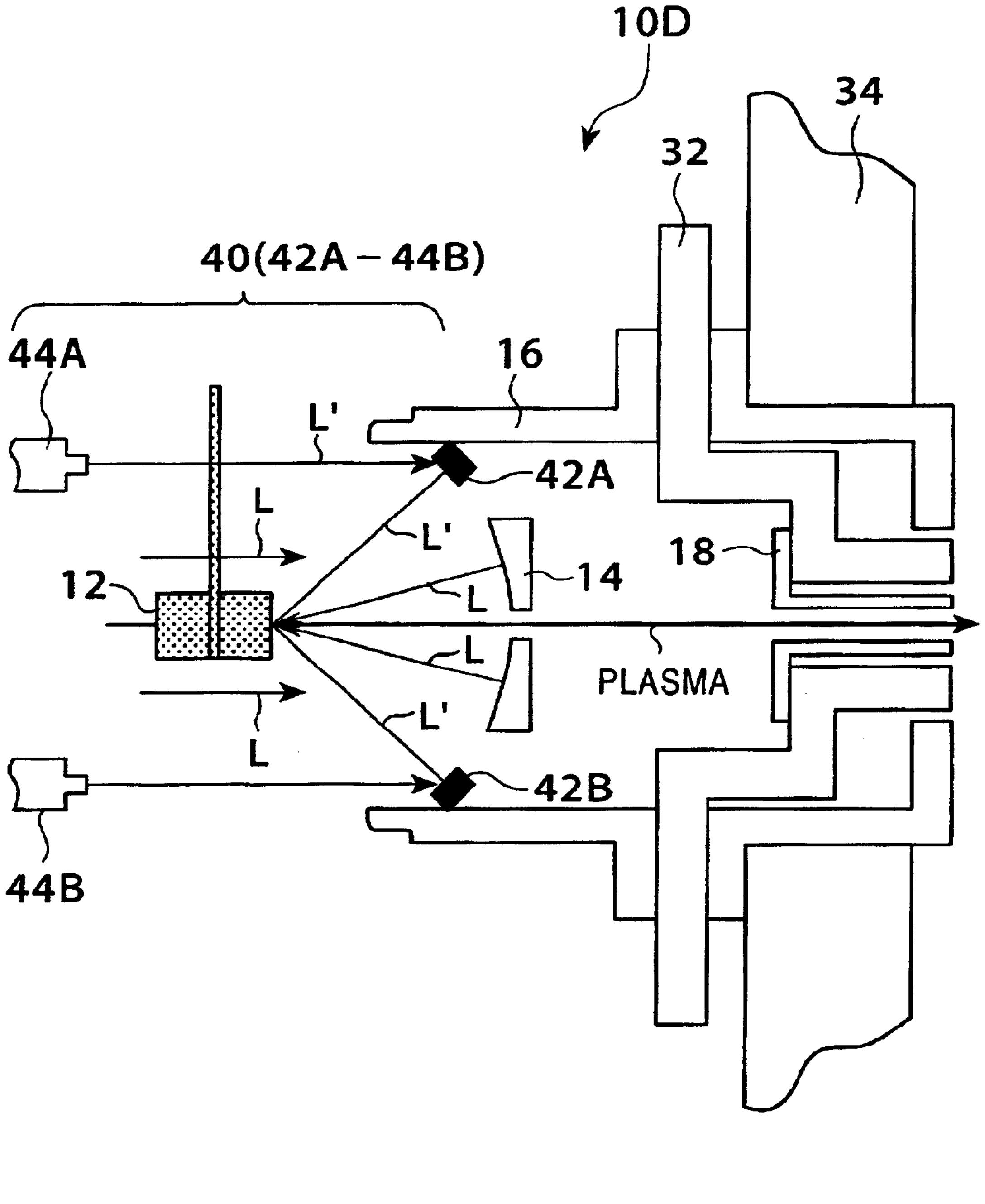
FIG. 6 is a partially expanded sectional view of a plasma-generating portion in a still further example of a direct ion injection system that is used for an ion accelerator according to the first example of the present invention, and the vicinity of an ion entrance of the ion accelerator.

Next, in the direct ion injection system 10D of the ion accelerator 20 according to the example shown in FIG. 6, respective constructions of the plasma-generating target 12, focusing lens 14, vacuum chamber 16, and injection slit 18 are common to those of the direct ion injection system 10 shown in FIG. 2.

On the other hand, in this example, as shown in FIG. 6, a target positioning device 40 which comprises two mirrors 42A and 42B, and two centering laser generators 44A and 44B, and performs the alignment of the plasma-generating target 12 with the focus of the plasma-generating laser L' is installed in the vacuum chamber 16.

Since the position of the plasma-generating target 12 and the focal position on the plasma-generating laser L must be on an ion beam axis, it is desirable to be adjusted by using a surveying telescope or a surveying laser that is installed in the downstream of the ion linac 30.

However, actually, since a beam line (analysis electromagnet 70 etc.) is installed in the downstream of the ion linac 30, it is complicated to remove the beam line at the time of exchange of the plasma-generating target 12 and to install the surveying telescope or the surveying laser.

Then, in the above-described construction, it becomes possible to easily perform the accurate alignment of the plasma-generating target 12 with the focus of the plasma-generating laser L by radiating a surveying laser L' from the two centering laser generators 44A and 44B, from the rear of the vacuum chamber 16, and aligning the point where these surveying lasers L' cross, with a predetermined position.

Figure 7:
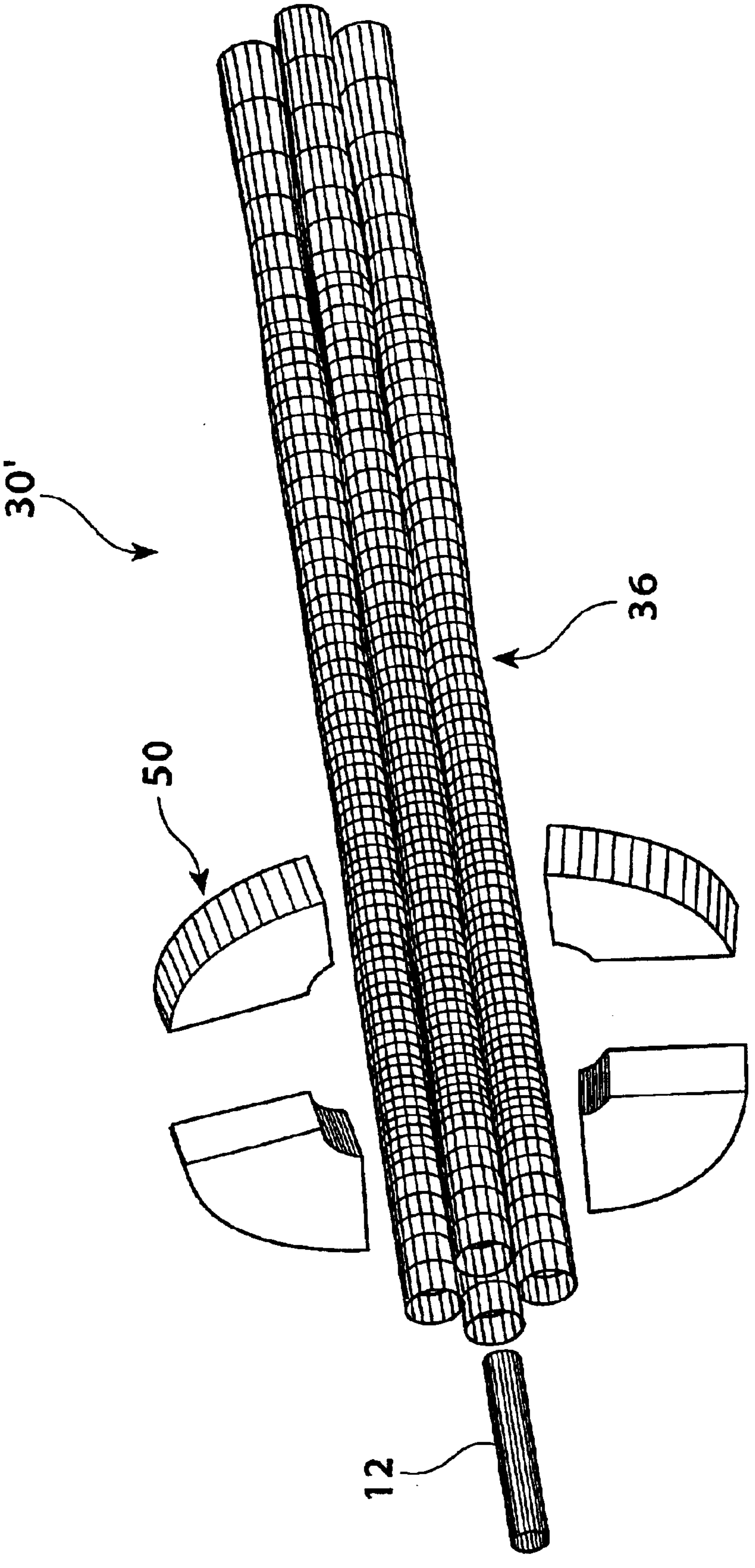
FIG. 7 is a partially enlarged perspective view of a plasma-generating portion in another example of a direct ion injection system that is used for an ion accelerator according to the first example of the present invention, and an acceleration electrode (rod) of an RFQ linac.

Next, in the direct ion injection system of the ion accelerator 20 according to the example shown in FIG. 7, in the case that an RFQ linac 30' equipped with a four-rod electrode 36 as an acceleration electrode is used as the ion linac 30, a split type focusing lens 50 which condenses a plasma-generating laser is installed inside this RFQ linac 30'.

In such a construction, since a space for installing the focusing lens 14 shown in FIG. 2 becomes unnecessary, the distance between the plasma-generating target 12 and RFQ linac 30 becomes short, it becomes possible to increase an amount of accelerable ions.

In particular, when the split type focusing lens 50 is used for the RFQ linac 30, it becomes possible to reduce the influence to the resonance mechanism of the RFQ linac 30 as low as possible.

In addition, dividing of the focusing lens 50 into four parts is advantageous because it allows the symmetry of the resonator 34 in high frequency characteristics to be maintained.

An ion accelerator according to the present invention is not limited to above-described respective examples, but various modifications are possible.

For example, although the direct ion injection system of the ion accelerator is described in the above-described example in the construction wherein it is installed in the ion entrance of the ion linac through the insulation flange, since the feature of the present invention, particularly, is to significantly increase the amount of accelerable ions by directly installing an direct ion injection system in an ion entrance of an ion linac, the present invention is not necessarily limited to this example.

In addition, the example that a plasma-generating target is used as a plasma-generating source is described in the above-described example.

Although this is a suitable example since this can generate high-density plasma as described above, it is also possible to use a device that generates plasma by using another plasma-generating source such as a high-voltage discharge, or a microwave.

Second Example

By the way, a vacuum chamber is maintained at high potential by a high voltage power supply and ions are extracted from plasma in the ion accelerator 20 according to the above-described first example.

Although the ion accelerator 20 according to the first example has advantages that construction is simplified and the amount of accelerable ions also increases sharply, it has the room of improvement from the following viewpoints.

First, the method of maintaining plasma at high potential like the ion accelerator 20 according to the first example has a disadvantage that it is difficult to capture all the plasma due to a large angle of divergence of generated plasma since it is necessary to maintain the distance of several tens cm or more between the plasma-generating target 12 and ion linac 30 for insulation.

In addition, the case where a high power pulsed laser L is used the method has a problem that it is extremely difficult to extend pulse width in the ion accelerator 20 using the ion linac 30 of the first example since the pulse width of an ion beam pulse obtained is only about 1 $\mu$s.

Furthermore, in the ion accelerator 20 according to the first example the complicated construction of including an apparatus for high voltage generation is necessary since it is necessary for insulating the vacuum chamber 16 including the plasma-generating target 12.

On the other hand, it is found that, so long as a plasma-generating target that generates plasma by radiating the Laser L on a target is limited as an ion source used for the ion accelerator 20 according to the first example, the above-described high voltage power supply is not always necessary since plasma can be made to be injected into a convergence/acceleration channel of the ion linac 30 by using diffusion velocity.

Therefore, plainly speaking, the ion accelerator according to the second example is an apparatus that is obtained by greatly simplifying the combination of the vacuum chamber 16 for a target in the ion accelerator 20, and an ion linac 30 in the first example, in which all the ions included in the generated accelerable plasma are efficiently extracted, and which is improved so that an ion beam with large pulse width is also accelerable.

An ion accelerator according to this example will be described by using FIGS. 8 to 10 with referring to FIG. 2.

First, the fundamental construction of the accelerator 120 according to the present invention will be described by using FIGS. 8 and 9.

Figure 8:
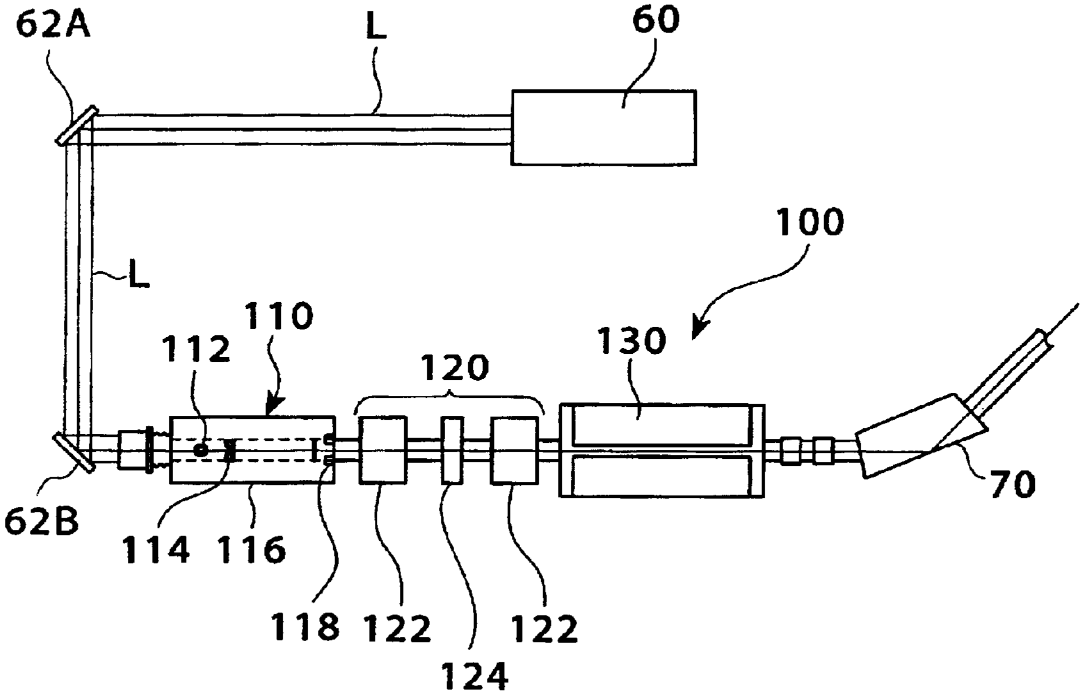
FIG. 8 is a plan showing the overview of an ion accelerator according to the second example of the present invention.

FIG. 8 is a plan showing the overview of the ion accelerator 120 according to this example.

FIG. 9 is a schematic constitutional perspective view of the case where a plasma-generating target and a focusing lens are arranged at the time of using a four-rod type RFQ linac as an ion linac used for the ion accelerator 120 according to this example.

Main components of the ion accelerator 120 according to this example are an ion linac 130 and a direct ion injection system 110 that is directly attached to the ion entrance of this ion linac 130, as shown in FIG. 8.

A well-known ion linac such as an RFQ linac or a drift tube type linac is used in the ion linac 130, like the ion accelerator 20 (refer to FIG. 1), according to the first example.

Therefore, the ion linac 130 may be mentioned below as an RFQ linac properly.

The direct ion injection system 110 comprises a plasma-generating target 112 that generates plasma by radiating a plasma-generating laser L, a focusing lens 114 (refer to FIG. 9) that condenses the plasma-generating laser L at the plasma-generating target 112, and a vacuum chamber 116 that contains the generated plasma in vacuum.

The focusing lens 114 is implemented as a split type focusing lens 114 that condenses a plasma-generating laser inside the ion linac 130.

In addition, although an example of using a four-rod type RFQ linac as the ion linac 130 used for the ion accelerator 120 according to this example is shown in FIG. 9, it is also naturally possible to use a four-vane type RFQ linac for this.

On the other hand and differing from the ion accelerator 20 according to the first example, the direct ion injection system 110 according to this example has the construction of directly installing a vacuum chamber 116 to an ion entrance 38 of the ion linac 130 without using a high voltage power supply that boosts a voltage of the vacuum chamber 116 and extracts ions from plasma.

In addition, in FIG. 8, a laser generator 60 generates the plasma-generating laser L, and mirrors 62A and 62B guide the plasma-generating laser L to the direct ion injection system 110.

Under the above-described construction, the fundamental operation of the ion accelerator 120 according to this example will be described by using FIGS. 8 and 9 with referring to FIG. 2.

The pulsed plasma-generating laser L generated by the laser generator 60 is led to the vacuum chamber 116 by the mirrors 62A and 62B, is reflected by the focusing lens 114, and is condensed at the plasma-generating target 112, and hence, plasma is generated and defused from a surface of the heated plasma-generating target 112.

This plasma generated and diffused has diffusion velocity and enters into a resonator (refer to a component 34 in FIG. 2) of the ion linac 130 through the ion entrance 138, and ions having the design injection potential of the ion linac 130 are injected into an acceleration channel (a gap of an acceleration electrode) due to the difference in mass.

On the other hand, electrons receive divergent force, and are finally absorbed by an inner wall of the resonator.

In the ion accelerator 120 according to this example, with differing from the ion accelerator 20 according to the first example, the vacuum chamber 116 to which a high voltage is applied and in which plasma is generated is not installed through an insulated portion (refer to a component 32 in FIG. 2).

Consequently, the plasma-generating target 112 can be brought close to the acceleration electrode (see a component 36 in FIG. 2) of the ion linac 130 to a limit, and almost all the generated ions can be injected at the diffusion velocity of the plasma itself inside the ion linac 130 without applying the high voltage.

Therefore, according to the ion accelerator 120 of this example, it becomes possible to more efficiently accelerate even a pulsed ion beam with large current by laser excitation since construction is simplified rather than that of the ion accelerator 20 according to the first example.

In addition, usually, since a strong high-frequency electric field is generated inside an ion linac 130, and hence almost no injected electrons can stay in the acceleration channel of the ion linac 130, the ions and electrons are efficiently separated.

In addition, since the ion accelerator 120 according to this example has the construction of installing the split type focusing lens 114, which condenses a plasma generating laser inside the ion linac 130, the distance between the plasma-generating target 112 and ion linac 130 becomes further small, and hence, the amount of accelerable ions can be further increased.

Here, as shown in FIG. 9, by using the four-rod type RFQ linac 130 as the ion linac 130, it becomes possible to shorten the distance to a limit with suppressing the influence of a target to a high frequency resonator to the minimum.

For example, in this example, since the maximum divergent angle of plasma is about 20 degrees, almost all the ions can be captured if the plasma-generating target 112 is arranged in the distance of about 15 mm in the case of an RFQ linac with average bore radius of about 5 mm.

Next, an example of the ion accelerator 120 different from the above-described example will be described by using FIG. 10.

FIG. 10 is a horizontal or vertical sectional view of an RFQ electrode in the case where a four-vane type RFQ linac is used as the ion linac 130 used for the ion accelerator 120 according to this example and a no-modulation section is formed in this vane electrode.

By the way, the ion beam injected into the acceleration channel is captured in the direction perpendicular to a traveling direction with convergent force of the RFQ linac 130, and rapidly spreads under the influence of Coulomb repulsion and velocity distribution in the traveling direction.

Therefore, as shown in FIG. 10, by providing a section without modulation by the acceleration electrode due to the linear tip geometry of the acceleration electrode, that is, a section of the electrode geometry without generating the bunch structure of a beam in a traveling direction and accelerating the beam, it becomes possible to easily increase bunch length several tens or more times in the section of several meters.

In particular, this method is effective since the impingement rate of the plasma, which is generated and diffused from a surface of the plasma-generating target 112, like the ion accelerator 120 according to this example is very slow.

Since the ion beam that is separated and captured by the ion linac 130 is comparatively slow and has the velocity distribution of each ion particle in the same extent as the speed of the ion beam when the no-modulation section where the pulse width of ions is extended is formed in the acceleration electrode of an ion linac 130, it is possible to generate a pulse with the pulse width of several tens μs with the several-meters ion linac 130 since ion particles spread in the axial direction of the ion linac 130 by designing a long area where an accelerating electric field of the ion linac 130 is not generated.

For example, supposing plasma with 100 eV per nucleon is injected into the four-vane type RFQ linac 130 with having the energy variance of ±50 eV, it is possible to extend the beam pulse width to 14 μs by providing the three-meters non-modulation section.

Furthermore, since Coulomb repulsion strongly acts in the beam axial direction, longer pulse width is expectable.

The ion accelerator according to this example is not limited to above-described respective examples, but various modifications are possible.

For example, an injection slit may be adjustably installed in the radial direction of an ion entrance in the ion entrance of an ion linac.

Owing to such construction, it is possible to prevent a discharge from being caused by excessive plasma striking an acceleration electrode of the linac when a divergence angle of the generated plasma is large, and to efficiently separate ions and electrons.

In addition, it becomes possible to perform positioning for the accurate centering of the injection slit to the linac.

As another modification example of this example, a plasma-generating target can be also cylindrical so as to be rotatable.

Owing to such construction, although the plasma-generating target is damaged when the plasma-generating laser is radiated, it becomes possible to always obtain a good target surface without exchanging the plasma-generating target by changing a radiated position by rotating the plasma-generating target by a predetermined angle.

Furthermore, it is also good to make the beam-condensing unit, described in the above-described example, be movable in three axial directions by installing the beam-condensing unit with bellows etc.

Owing to such construction, it becomes possible to adjust a focusing position of a plasma-generating laser on a plasma-generating target, and to enhance plasma-generating efficiency.

In addition, in the above-described example, when a target positioning device that comprises two mirrors, and two centering laser generators and performs the alignment of the plasma-generating target and a focus of the plasma generating laser is installed in the vacuum chamber, it is possible to easily perform the accurate alignment of the plasma-generating target and focus of the plasma generating laser by radiating surveying laser beams, emitted from the two centering laser generators, from the rear of the vacuum chamber and making a point where these two surveying laser beams cross coincide with an original location.

Since an ion accelerator and a direct ion injection method according to the present invention are constituted as described above, they exhibit outstanding effectiveness as follows.

(1) An ion accelerator according to the present invention, as described in the first aspect, comprises: a plasma-generating source; a vacuum chamber for extracting ions from plasma generated from the plasma-generating source; an ion linac, the plasma-generating source, vacuum chamber, and ion linac being connected in series, the vacuum chamber being installed near an ion entrance of the ion linac; and a high voltage power supply boosting the vacuum chamber to a desired voltage, wherein ions are directly injected from the vacuum chamber to the ion linac. Accordingly, since Coulomb repulsion is not generated because electrons with negative charges and ions with positive charges coexist in the plasma, its influence is avoidable to the point just before an ion linac, and in consequence, the construction is simplified and an amount of accelerable ions also significantly increases.

(2) As described in the second aspect, when, in the ion accelerator, an injection slit is installed in an ion entrance of an ion linac, it is possible when a divergence angle of the generated plasma is large to prevent a bombardment with excess plasma onto an acceleration electrode of the linac, and discharge occurrence.

(3) In addition, usually, since a strong high-frequency electric field is generated near an entrance of an ion linac, and hence few the electrons passing the slit in this region can be injected to an acceleration channel of the linac, the ions and electrons are efficiently separated.

(4) As described in the third aspect, when, in the ion accelerator, an injection slit is installed adjustably in the radial direction of an ion entrance of an ion linac, it becomes possible to perform positioning for the accurate centering of the injection slit with respect to the linac.

(5) As described in the fourth aspect, when, in the ion accelerator, the plasma-generating source is a plasma-generating target for generating plasma by a plasma-generating laser being radiated thereon, it becomes possible to increase the strength of accelerable ions since high-density plasma can be generated.

(6) As described in the fifth aspect, when, in the ion accelerator, a focusing of a plasma-generating laser radiated at a plasma-generating target is installed in the vacuum chamber, it becomes possible to increase plasma generation efficiency since the density of the plasma-generating laser on the plasma-generating target increases.

(7) As described in the sixth aspect, when, in the ion accelerator, the focusing is installed so that it can move in three axes, it becomes possible to adjust a focusing position of the plasma-generating laser on the plasma-generating target.

(8) As described in the seventh aspect, when the ion accelerator comprises a target positioning device having one or more mirrors and one or more centering lasers, which performs the alignment of the plasma-generating target and a focus of the plasma-generating laser, it becomes possible to perform the accurate alignment of the plasma-generating target with the focus of the plasma-generating laser.

(9) As described in the eighth aspect, when the ion accelerator comprises a split type focusing lens installed inside an ion linac and condensing a plasma-generating laser, it becomes possible to increase an amount of accelerable ions since the distance between the plasma-generating target and ion linac becomes short.

(10) As described in the ninth aspect, when, in the ion accelerator, the plasma-generating target is cylindrical so as to be rotatable, although the plasma-generating target is damaged when the plasma-generating laser is radiated, it becomes possible to always obtain a good target surface without exchanging the plasma-generating target by rotating the plasma-generating target by a predetermined angle to change a radiated position.

(11) As described in the tenth aspect, when, in the ion accelerator, the vacuum chamber is boosted by the high-voltage power supply so that the injection energy of ions is a design injection energy of the ion linac, only the ions having passed the slit are injected into the ion linac and accelerated since the voltage equivalent to the ion beam energy for satisfying the design condition of the ion linac is applied to the vacuum chamber with the generated plasma.

(12) At that time, since the ion beam is in a state just after being emitted from the plasma, the influence of Coulomb repulsion is very small, and hence, it is also possible to avoid the influence of the abrupt change of the number of ionic charges and the amount of current which changes within a pulse.

(13) As described in the eleventh aspect, when, in a direct ion injection method according to the present invention, an ion accelerator according to any of claims 1 to 10 is used so as to directly inject ions generated from the plasma-generating source, from the ion entrance of an ion linac, since Coulomb repulsion is not generated because electrons with negative charges and ions with positive charges coexist in plasma, its influence is avoidable to the point just before an ion linac, and in consequence, the construction is simplified and an amount of accelerable ions also significantly increases.

(14) Owing to such constitution that is described in the twelfth aspect, it becomes possible in the ion linac according to the present invention to let the plasma-generating target get close to an acceleration electrode of the ion linac to a limit since it becomes unnecessary to install a vacuum chamber, to which a high voltage is applied and in which plasma is generated, through an insulated section with differing from the ion accelerators mentioned in the above-described first to tenth aspects, and hence, it becomes possible to inject almost all of generated ions into the ion linac at the own diffusion velocity of the plasma without applying a high voltage.

(15) Therefore, according to the twelfth aspect, it is possible to efficiently accelerate even a pulsed ion beam with large current, which is excited by a laser, by a simplified apparatus.

(16) In this result, since Coulomb repulsion is not generated because electrons with negative charges and ions with positive charges are intermingled in plasma, its influence is avoidable just before the ion linac.

(17) At that time, since an ion beam is immediately after being emitted from the plasma, the influence of Coulomb repulsion is very small, and hence, it is also possible to avoid the influence of the abrupt change of the number of ionic charges and the amount of current that changes within a pulse.

(18) In addition, usually, since a strong high-frequency electric field is generated inside an ion linac, and hence almost all the injected electrons cannot stay in an acceleration channel of the linac, the ions and electrons are efficiently separated.

(19) As described in the thirteenth aspect, since the ion beam that is separated and captured by the ion linac is comparatively slow and has the velocity distribution of each ion particle in the same extent as the speed of the ion beam when the non-modulation section where the pulse width of ions is extended is formed in the acceleration electrode of the ion linac used for the ion accelerator, it is possible to generate a pulse with the pulse width of several tens pLs with the several-meters ion linac since ion particles spread in the axial direction of the ion linac by designing a long area where an accelerating electric field of the ion linac is not generated.

(20) As described in the fourteenth aspect, in an ion accelerator, owing to the construction that an injection slit is installed in an ion entrance of an ion linac, it is possible to prevent a discharge from being caused by excessive plasma striking an acceleration electrode of the linac when a divergence angle of the generated plasma is large.

(21) In addition, usually, since a strong high-frequency electric field is generated near an entrance of an ion linac, and hence almost all the electrons passing the slit in this region cannot be injected to an acceleration channel of the linac, the ions and electrons are efficiently separated.

(22) As described in the fifteenth aspect, owing to the construction that an injection slit is adjustably installed in the radial direction of an ion entrance of an ion linac, it becomes possible to perform positioning for the accurate centering of the injection slit to the linac.

(23) As described in the sixteenth aspect, since an ion accelerator has the construction of installing a split type focusing lens, which condenses a plasma generating laser, inside an ion linac, the distance between a plasma-generating target and the ion linac becomes further small, and hence, the amount of accelerable ions can be further increased.

(24) As described in the seventeenth aspect, when an ion accelerator has the construction that a beam-condensing unit is installed so that it can move in three axes, it becomes possible to adjust a focusing position of a plasma-generating laser on a plasma-generating target.

(25) As described in the eighteenth aspect, when an ion accelerator comprising one or more mirrors, one or more centering lasers, and a target positioning device that performs the alignment of a plasma-generating target and a focus of a plasma-generating laser, it becomes possible to perform the accurate alignment of the plasma-generating target and the focus of the plasma-generating laser.

(26) As described in the nineteenth aspect, although a plasma-generating target is damaged at the time of a plasma-generating laser being radiated when an ion accelerator where the plasma-generating target is cylindrical so as to be rotatable, it becomes possible to always obtain a good target surface without exchanging the plasma-generating target because of being able to change a radiated position by rotating the plasma-generating target by a predetermined angle.

(27) As described in the twentieth aspect, when an RFQ linac or a drift tube type linac is used as an ion linac, it becomes possible to obtain an ion accelerator equipped with an ion linac suitable for ion acceleration.

What is claimed is:

1. An ion accelerator comprising:

a plasma-generating source configured to generate a plasma having reduced Coulomb repulsion;

a vacuum chamber;

an ion linac, said plasma-generating source, said vacuum chamber and said ion linac being connected in series, said vacuum chamber being installed near an ion entrance of the ion linac; and a high voltage power supply configured to boost said vacuum chamber to a desired voltage sufficient to directly inject ions from the plasma into the ion linac at plasma diffusion velocity.

2. The ion accelerator according to claim 1, further comprising an injection slit installed in an ion entrance of said ion linac.

3. The ion accelerator according to claim 2, wherein said injection slit is configured to be adjustable in a radial direction of the ion entrance so as to accurately center the injection slit relative to the ion entrance of said ion linac.

4. The ion accelerator according to any one of claims 1 to 3, wherein said plasma-generating source includes a plasma-generating target configured to generate plasma in response to a plasma-generating laser being radiated thereon.

5. The ion accelerator according to claim 4, further comprising a lens installed in the vacuum chamber and configured to focus radiating from the plasma-generating laser on to said plasma-generating target.

6. The ion accelerator according to claim 5, wherein said lens is installed by a mount configured to permit the lens to be able to move along three different directions corresponding to three different axes.

7. The ion accelerator according to claim 6, further comprising a target alignment device including one or more mirrors and one or more centering lasers configured to accurately align the plasma-generating target with a lens focal point.

8. The ion accelerator according to claim 7, comprising a split type focusing lens installed inside said ion linac.

9. The ion accelerator according to claim 7, wherein said plasma-generating target is cylindrical and is mounted to be rotatable.

10. A direct ion injection method using the ion accelerator according to claim 9 to directly inject ions from the vacuum chamber to the ion entrance of the ion linac.

11. The ion accelerator according to claim 1, wherein a radio frequency quadrupole (RFQ) linac or a drift tube type linac is used as the ion linac.

12. An ion accelerator comprising:

a plasma-generating source; and an ion linac, wherein said plasma-generating source and said ion linac are arranged in series and the ion linac includes a non-modulation section for extending pulse width of ions formed as one part of an acceleration electrode also having a modulation section.

13. The ion accelerator according to claim 12, further comprising an injection slit installed in an ion entrance of the ion linac.

14. The ion accelerator according to claim 13, wherein said injection slit is configured to be adjustable in a radial direction of the ion entrance so as to accurately center the injection slit relative to the ion entrance of the ion linac.

15. The ion accelerator according to any one of claims 12 to 14, further comprising a beam-condensing unit including a split type focusing lens that is installed inside the ion linac.

16. The ion accelerator according to claim 15, wherein the beam-condensing unit is installed by a mount configured so as to be able to move along three different directions corresponding to three different axes.

17. The ion accelerator according to any one of claims 12 to 16, wherein the plasma-generating target is cylindrical and is mounted to be rotatable.

18. The ion accelerator according to any one of claims 12 to 14, wherein a radio frequency quadruple (RFQ) linac is used as the ion linac.

* * * * *